(12) United States Patent
Moller et al.

(10) Patent No.: US 6,642,455 B2
(45) Date of Patent: Nov. 4, 2003

(54) EMI TRANSFER FITTING

(75) Inventors: Jorgen Moller, Oakville (CA); Thomas Kramer Nielsen, Oakville (CA)

(73) Assignee: MTG Moltec Trading Group Ltd., Oakville (CA)

( * ) Notice: Subject to any disclaimer, the term of this patent is extended or adjusted under 35 U.S.C. 154(b) by 0 days.

(21) Appl. No.: 09/992,425

(22) Filed: Nov. 26, 2001

(65) Prior Publication Data

US 2003/0094303 A1 May 22, 2003

(51) Int. Cl.⁷ .................................................. H01R 9/00
(52) U.S. Cl. ...................................................... 174/84 R
(58) Field of Search ............................ 174/84 R, 21 R, 174/21 JS, 88 R, 85, 88 C; 439/320, 583, 584

(56) References Cited

U.S. PATENT DOCUMENTS

| | | | | | |
|---|---|---|---|---|---|
| 1,497,002 | A | * | 6/1924 | Sanderson | ................ 174/21 JS |
| 2,053,808 | A | * | 9/1936 | Young | ....................... 174/21 R |
| 2,549,264 | A | * | 4/1951 | Timmins | ..................... 174/15.7 |
| 2,740,059 | A | * | 3/1956 | Conery | ..................... 174/21 R |
| 2,822,418 | A | * | 2/1958 | Dinnick | ...................... 174/21 C |

* cited by examiner

Primary Examiner—Chau N. Nguyen
(74) Attorney, Agent, or Firm—Marks & Clerk

(57) ABSTRACT

An EMI transfer fitting suitable for use in submarines and other harsh environments is provided. In one embodiment, the EMI transfer fitting has two couplers, that collectively provide a mechanically robust interconnection between a flexible conduit (through which a bundle of data cables is encased by a wire mesh sheath that provides EMI shielding), and a rigid conduit made from a metallic material that requires no separate wire mesh sheath to provide EMI shielding. In addition to providing a robust mechanical interconnection, the transfer fitting provides a robust and seamless EMI shielding between the flexible conduit and the rigid conduit.

13 Claims, 3 Drawing Sheets

EMI TRANSFER FITTING

FIELD OF THE INVENTION

The present invention relates generally to fittings, such as fittings for interconnecting sections of conduit, and more particularly relates to transfer fittings that are shielded from electromagnetic interference ("EMI").

BACKGROUND OF THE INVENTION

Fittings are well known. One particular application for various types of fittings is to interconnect sections of conduit that carry electrical wires or cables, such as power cables and/or bundles of data cables. (It is to be understood by those of skill in the art that, in the present application, the terms "wires" and "cables" can generally refer to any type of conductor, suitable for a particular application, that is carried through a section of conduit). With society's greater reliance on dependable electronic data exchange, bundles of data cables that form the backbone of networks are now ubiquitous, and electromagnetic compatibility can be an important requirement in the design of the cables and the conduits that carry them. Bundles of data cables are now frequently run through fixed structures, such as houses, skyscrapers, and through vehicles such as cars, trucks, aircraft, naval ships, submarines or any other type of like-installation.

When running data cables through structures, vehicles and other locations it is important to provide adequate mechanical protection and/or EMI protection, depending on the particular needs of the data cable and the types of environmental hazards to which the cable may be exposed. Whereas prior art conduits used for power cables were primarily designed to provide mechanical protection, more modem data cables can be greatly suceptible to EMI, which can greatly degrade and/or otherwise impair proper functioning of the computer network that the data cable supports.

In submarines, data cables can be succeptible to a wide variety of mechanical and EMI stresses that are particularly unique to the submarine environment, and thus, prior art fittings for interconnecting sections of conduit, either of the same or different types, have proven to be unsuccesful in providing the desired and/or necessary robustness, thereby resulting in failure of the onboard computer networks. As will be well understood by any sailor in a combat situation, such failure could cost the sailor his or her life. Mechanical stresses peculiar to submarines can include torsional stresses on the hull of the ship, which thereby stresses any conduit runs, and fittings interconnecting such conduit. Further mechanical stresses can include exposure to water, particularly when, as in the case of a naval vessel, conduits are being cleaned using high-pressure water spray. Conduits must thus be able to withstand the pressure of the waterspray while protecting the cable and the sheathing running through the inside the conduit. EMI stresses on submarines can also be unique, such as the need to protect the data cables running through the submarine from external EMI caused by floating ground connections, and from the movement of the submarine through external magnetic fields. Additionally, it is considered important to shield data cables from emitting their own EMI, which could interfere with SONAR readings and/or adjacent data cables.

An additional problem with prior art transfer fittings arises when retrofitting older structures or installations, such as submarines, with modem bundles of data cables. During such retrofits, it is often necessary to affix a transfer fitting to the end of a piece of unthreaded conduit. Such unthreaded conduit can be found in portions of the vessel where a continuous piece of conduit must be cut in order to feed the cable through the conduit, thus leaving an exposed piece of conduit with an unthreaded end, making conventional, complementary threaded transfer fittings unusable. Thus, the aforementioned disadvantages of the prior art are compounded when attaching a transfer fitting to an unthreaded piece of conduit.

It is therefore desirable to have a robust transfer fitting for interconnecting conduits that can withstand high stress environments, including both mechanical and EMI stresses.

SUMMARY OF THE INVENTION

It is therefore an object of the invention to provide a novel EMI transfer fitting that obviates or mitigates at least one of the disadvantages of the prior art.

In an aspect of the invention, there is provided an EMI transfer fitting comprising a first coupler for connection to an unthreaded rigid conduit for carrying a cable bundle. The EMI transfer fitting also has a second coupler for connection to a second piece of conduit. The first coupler has a first male fastener, a compression ring and a first female fastener for receiving the rigid conduit therethrough. One of the fasteners is at a distal end adjacent to the rigid conduit and the other of the fasteners is at a proximal end that is opposite the distal end. The first male fastener and the first female fastener have a first cooperating tightening means for urging the first male fastener towards the second female fastener, such that when said first fasteners are tightened, the compression ring has external pressure applied thereto and thereby securely grasping the rigid conduit within the first coupler.

In a second aspect of the invention, there is provided an EMI transfer fitting comprising a first coupler for connection to a first piece of conduit. The first coupler has a distal end that connects with the first piece of conduit, and a proximal end opposite from the distal end. The EMI transfer fitting of the second aspect has a second coupler attached to the proximal end, the second coupler having an attachment means for connecting to a flexible conduit for carrying a sheathed cable therein, the second coupler further having a second male fastener, a hollow insert for passing the cable therethrough and passing said sheath thereover, and a second female fastener, the second male fastener and the second female fastener having a second cooperating tightening means for urging the second male fastener towards the second female fastener, such that when the second fasteners are tightened the sheath is impinged between an exterior of the insert and an interior of the second coupler.

In a third aspect of the invention, the first two aspects are combined into a single transfer fitting.

An EMI transfer fitting suitable for use in submarines and other harsh environments is provided. In one embodiment, the EMI transfer fitting has two couplers, that collectively provide a mechanically robust interconnection between a flexible conduit (through which a bundle of data cables is encased by a wire mesh sheath that provides EMI shielding), and a rigid conduit made from a metallic material that requires no separate wire mesh sheath to provide EMI shielding. In addition to providing a robust mechanical interconnection, the transfer fitting provides a robust and seamless EMI shielding between the flexible conduit and the rigid conduit.

BRIEF DESCRIPTION OF THE DRAWINGS

Certain preferred embodiments of the present invention will now be discussed, by way of example only, with reference to the attached Figures in which.

DETAILED DESCRIPTION OF THE INVENTION

Figure 1:
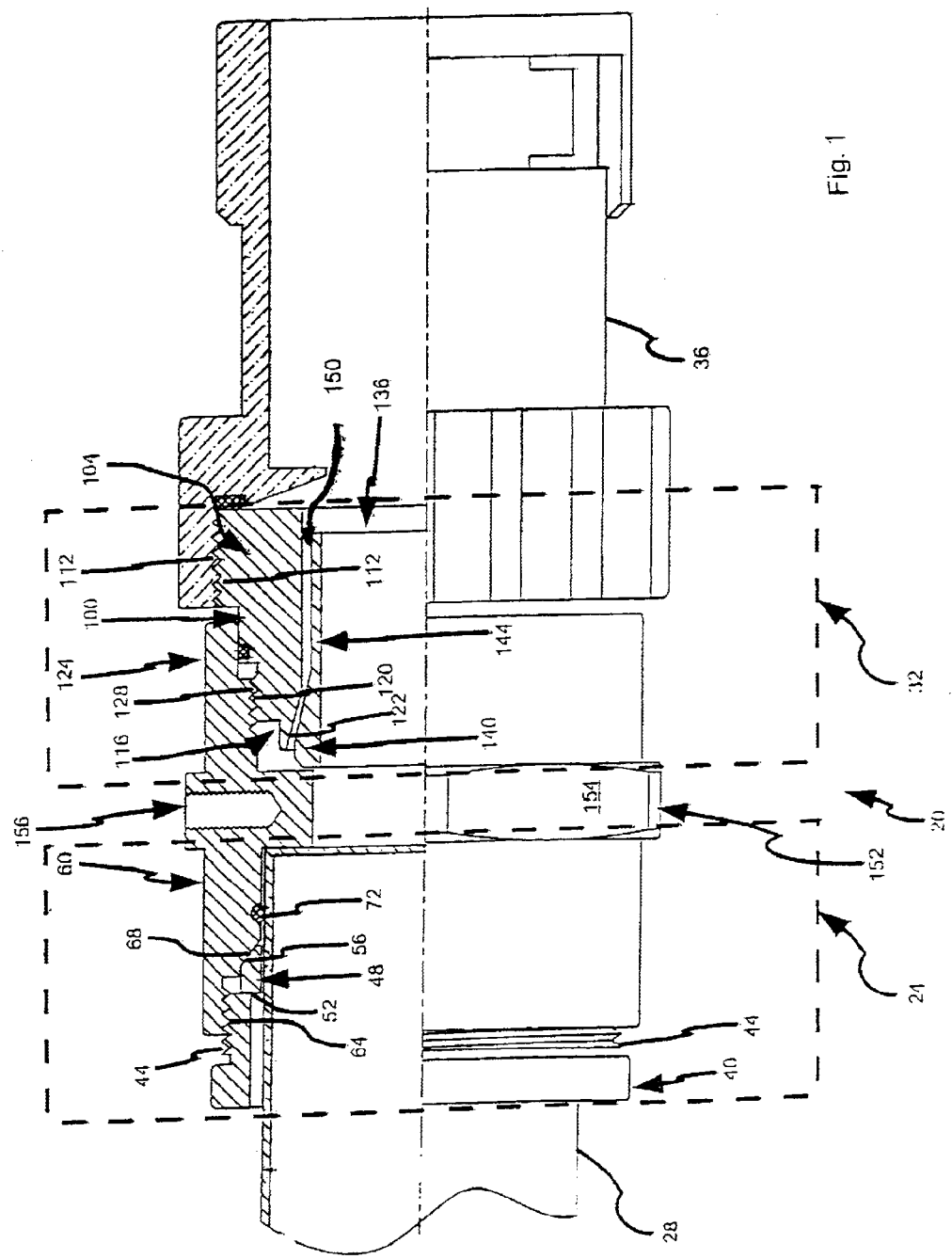
FIG. 1 is a side elevational view, in partial cross-section, showing a transfer fitting in accordance with an embodiment of the invention.

Referring now to FIG. 1, a transfer fitting in accordance with an embodiment of the invention is indicated generally at 20. Transfer fitting 20 comprises a first coupler 24 for connection to a first piece of conduit 28 and a second coupler 32 for connection a second piece of conduit 36. In the present embodiment, first piece of conduit 28 is rigid, while second piece of conduit 36 is flexible. Collectively, conduit 28 and transfer fitting 20 and conduit 36 form a mechanically robust and EMI shielded passage for electrical cabling, such as a data cables.

Figure 2:
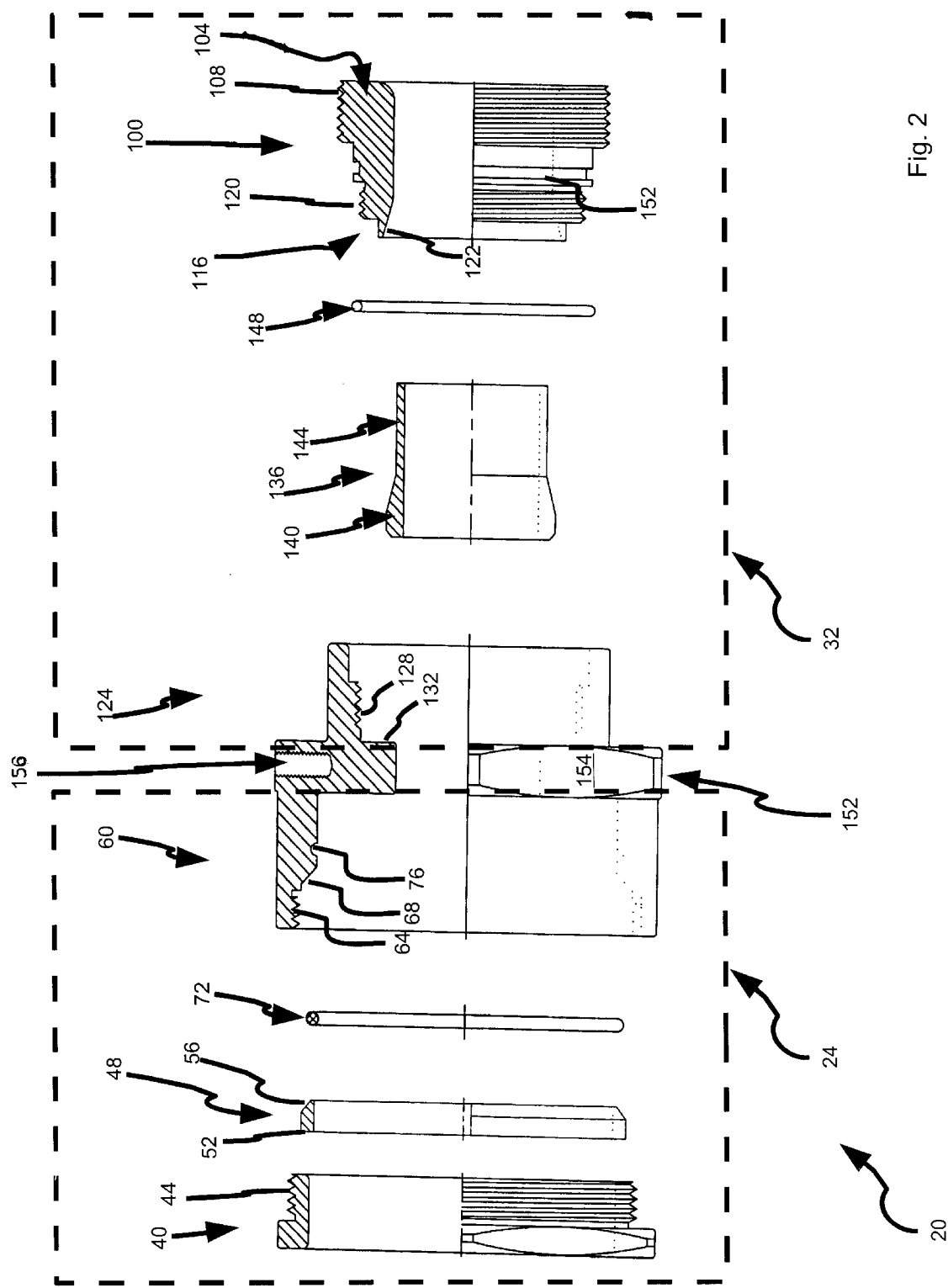
FIG. 2 is an exploded view of selected components of the transfer fitting shown in FIG. 1; and, FIG. 3 is an end view of the compression ring shown in FIGS. 1 and 2.
Figure 3:
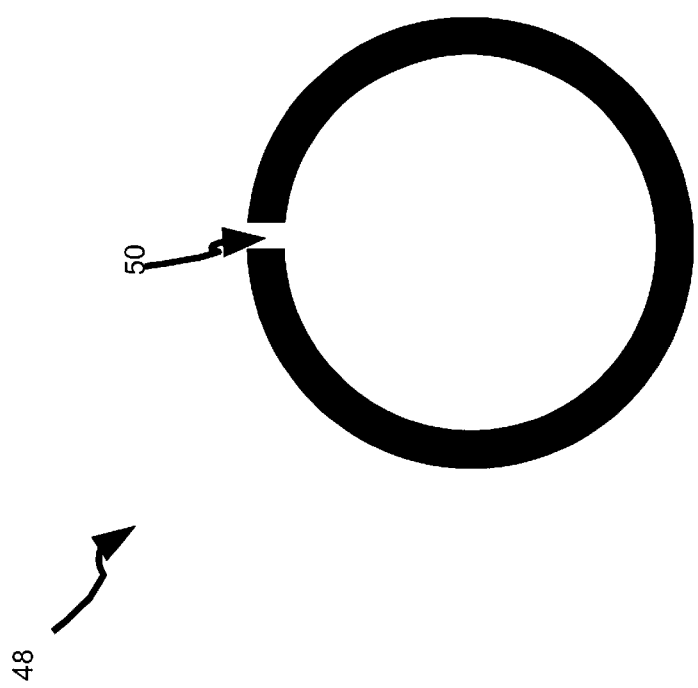

First coupler 24 also includes a compression ring 48 that is made from a suitable mechanically robust and EMI shielding material, such as the same material as used for fastener 40. Compression ring 48 is characterized by a substantially circular band. When viewed from the end, as shown in FIG. 3, the band of ring 48 is discontinuous, having a small gap 50 removed from the circumference of the circular shape of the band. The band is thus reliently deformable, and, in a resting position, has a substantially circular shape. In a compressed position, the gap 50 closes thus reducing the diameter of the circular shape, and thereby grasping a piece of conduit (such as conduit 28) passing therethrough. Thus, the material and band-formation of ring 48 cooperate such that its diameter will decrease by applying external pressure to its circumference. As best seen in FIG. 2, ring 48 has a squared-end 52 and a tapered-end 56. As best seen in FIG. 1, squared-end 52 abuts against the end of exterior thread 44 of fastener 48 when first coupler 48 is assembled.

As viewed in either FIG. 1 or FIG. 2, first coupler 24 includes a distal male fastener 40 having a substantially hollow cylindrical body that is large enough for conduit 28 to pass through the body. The larger extremity of fastener 40 (i.e. farthest from second coupler 32 as viewed in FIGS. 1 and 2), is hexagonally shaped for grasping and/or rotating fastener 40 by hand, or with a wrench or the like. By the same token, the smaller extremity of ring 40 (i.e. closest to second coupler 32 as viewed in FIGS. 1 and 2) is characterized by exterior threads 44. Male fastener 40 is preferably made from aluminum that is electroless nickel plated, in order to provide corrosion resistance while serving as EMI shielding for cabling that passes through fastener 40. Other type of corrosion resistant materials can also be used, such as an anodized material. Other materials can include brass, gold plated, titanium. Other types materials and alloys will occur to those of skill in the art.

First coupler 24 also includes a female fastener 60 that has a substantially hollow cylindrical body that is characterized by a set of interior threads 64 that are complementary to exterior threads 44. Female fastener 60 is thus operable to securely receive the set of exterior threads 44 of male fastener 40 within the cavity that is defined by the set of interior threads 64. Female fastener 60 is also characterized by a tapered-wall 68, which has an angle that is substantially the same angle as tapered-end 56 of ring 48.

Thus, as best seen in FIG. 1, when ring 48 is inserted into the cavity defined by interior threads 64 of female fastener 60, and exterior threads 44 of male fastener 40 are threaded within interior threads 64 of female fastener 60, squared-end 52 of ring 48 abuts the end of exterior thread 44 of fastener 48 while tapered-end 56 of ring 48 abuts with tapered-wall 68. Further, due to the gap within the band of ring 48, by continuing to tighten male fastener 40 within female fastener 60, tapered-end 56 will be driven against tapered-wall 68, thereby applying external pressure to the circumference of ring 48 and cause ring 48 to decrease in diameter. Accordingly, when first conduit 28 is assembled therewith by inserting the end of conduit 28 within the passageway defined by the components of coupler 24, continual tightening of male fastener 40 and the ensuing closure of ring 48 will cause ring 48 to grasp first conduit 28 securely within first coupler 24. It should now be apparent to those of skill in the art that first conduit 28 is thus preferably made from a rigid, non-deformable material, such as steel or aluminum, in order to ensure that tightening of male fastener 40 will not crush or otherwise deform conduit 28, but will instead form a strong frictional attachment of first coupler 24 with conduit 28. In a further characteristic of the present embodiment, conduit 28 is not threaded, thus making coupler 24 particularly suitable for connection to a rigid, unthreaded piece of conduit.

While optional, further mechanical protection from moisture exposure of the interior passage of male fastener 40 is provided by an O-ring 72, (or other appropriate type of gasket or sealing-member), which resides within a suitably dimensioned channel 76 located within the interior of female fastener 60. Additional mechanical grasping of conduit 28 can be achieved by sizing O-ring 72 to be slightly smaller in diameter than the exterior of conduit 28.

As variously described herein, male fastener 40 can be considered to be located at the distal end of first coupler 24, while the opposite end of coupler 24, located at female fastener 60, can be considered to be the proximal end of first coupler 24.

Second coupler 28 includes a distal male fastener 100 having a substantially cylindrical body having a hollow passageway of a desired size to allow a bundle of data cables, (or the like), to pass through therethrough. In a presently preferred embodiment, such a bundle of data cables is sheathed within a flexible wire mesh (not shown) that provides EMI shielding, and conduit 36 is formed from a flexible tubing, such as a corrogated plastic or the like. Male fastener 100 is characterized by a wide end 104 (i.e. the end distal to first coupler 28 as viewed in FIGS. 1 and 2). Wide end 104 has a set of exterior threads 108 for complementary engagement with a set of interior threads 112 located on the end of conduit 36. Male fastener 100 is further characterized by a narrow end 116 which has its own set of exterior threads 120 and an outwardly flared opening 122 that slightly widens the passageway of male fastener 100 at narrow end 116. (It will be understood that, in one variation of the present embodiment, male fastener 100 can be modified to work with a complementary varied conduit 36, wherein such a variation male fastener 100 is provided with interior threads, and conduit 36 is provided with exterior threads.)

Second coupler 28 also includes a female fastener 124 that is characterized by a hollow passageway having its own set of interior threads 128, which are complementary to exterior threads 120. The passageway of female fastener 124 terminates with a lip 132, the details of which will be discussed in greater detail below.

Second coupler 28 further includes an insert 136, which is also hollow to allow the bundle of data cables to pass therethrough, but is also formed to have the flexible wire mesh sheathing (i.e. the aforementioned sheathing that encases the bundle of data cables as it passes through conduit 36) to pass over the exterior of insert 136 in the space between insert 136 and male fastener 100, as shown at 150 in FIG. 1. Insert 136 is characterized by a flared portion 140 and a cylindrical portion 144.

Thus, as best seen in FIG. 1, the taper of flared portion 140 is complementary to the taper of outwardly flared opening 122 of male fastener 100 such that the wire mesh sheathing is impinged therebetween when second coupler 28 is assembled. The impingement of the wire mesh sheathing is further improved by additional tightening of male fastener 100 within female fastener 124, as the terminal end of flared portion 140 abuts lip 132 and thereby urges flared portion 140 against flared opening 122. The result is not only a secure mechanical connection of conduit 36 to second coupler 28, but also a continuous EMI sheathing for the entire bundle of cables, as the sheathing transitions from a wire mesh sheathing within conduit 36 to a sheathing that is accomplished by the metalic material of transfer fitting 20 and conduit 28.

While optional, further mechanical protection from moisture exposure of the interior passage of male fastener 40 is provided by an O-ring 148, (or other appropriate type of gasket or sealing-member), which resides within a suitably dimensioned channel 152 located on the exterior of male fastener 100.

It will now be apparent to those of skill in the art that, at least in the present embodiment, female fastener 60 and female fastener 124 are formed in a single junction unit 152, which in the present embodiment is characterized by a hexagonal housing 154 that includes at least one receptacle 156 (or the like) for attaching a ground terminal. Such a ground terminal is particularly desirable in an environment such as a submarine, where a plurality of conduits may need to have their sheathings electrically interconnected to ensure that a common ground potential exists for all conduits within the submarine. Such ground terminals can also be desirable in other installations, other than submarines, as will occur to those of skill in the art.

While the foregoing discussion describes certain presently preferred embodiments of the invention, it is to be understood the combinations, subsets, and variations of those embodiments are also within the scope of the invention. For example, it is contemplated that a transfer fitting in accordance with another embodiment of the invention could be characterized by a symmetric pair of couplers, wherein each coupler was either coupler 24 or coupler 32, as discussed above. As another example, it is contemplated that in another transfer fitting according to another embodiment the invention, the transfer fitting could be characterized by a single coupler, of the form shown in either coupler 24 or coupler 32, and wherein the opposite end of the transfer fitting was attached directly to a bulkhead, or other fixture, such that the transfer fitting in this embodiment would appear as a nipple on the fixture. Other variations will occur to those of skill in the art.

It will also be understood that in other embodiments of the invention, the EMI transfer fitting can be configured to adjoin two different pieces of conduit oriented at different angles—such as a ninety degree elbow.

The present invention provides a novel transfer fitting that provides a robust mechanical connection while providing continuous EMI shielding from one type of conduit to another, and is thus particularly useful in submarines and other harsh environments where mechanical protection and EMI shielding of sensitive data cables is required or otherwise desired. A further advantage of certain embodiments of the present invention is that connections to unthreaded pieces of rigid conduit are possible, as can be found on older naval vessels that are retrofitted with modem communication networks, particularly in locations where transfer fittings are attached to cut sections of conduit within existing conduit runs—making the threading of such conduit runs difficult or impractical.

The foregoing discussion provides certain exemplary embodiments of the invention and is not to be construed as limiting the scope of the invention, which is solely defined by the claims appended hereto.

We claim:

1. An EMI transfer fitting comprising:
   a first coupler for connection to an unthreaded rigid conduit for carrying a cable bundle, said first coupler having a first male fastener, a compression ring and a first female fastener for receiving said conduit therethrough, one of said fasteners being at a distal end adjacent to said rigid conduit and the other of said fasteners being at a proximal end opposite said distal end, said first male fastener and said first female fastener having a first cooperating tightening means for urging said first male fastener towards said female fastener, such that when said first male and female fasteners are tightened, said compression ring has external pressure applied thereto thereby securely grasping said conduit within said first coupler; and
   a second coupler attached to said proximal end, said second coupler having an attachment means for connecting to a flexible conduit for carrying a sheathed cable therein, said second coupler further having a second male fastener, a hollow insert for passing said cable therethrough and passing said sheath thereover, and a second female fastener, said second male fastener and said second female fastener having a second cooperating tightening means for urging said second male fastener towards said second female fastener, such that when said second male and female fasteners are tightened said sheath is impinged between an exterior of said insert and an interior of said second male fastener.

2. The EMI transfer fitting of claim 1 wherein at least one of said first and said second tightening means is characterized by an exterior thread on its respective male fastener and a complementary interior thread on its respective female fastener.

3. The EMI transfer fitting of claim 1 further comprising a sealing means housed within at least one of said couplers.

4. The EMI transfer fitting of claim 3 wherein said sealing means is an O-ring.

5. The EMI transfer fitting of claim 1 wherein said compression ring is characterized by a substantially circular band having a gap therein such that external pressure thereto causes said band to decrease in diameter and said gap to decrease in size.

6. The EMI transfer fitting of claim 1 wherein said first at least one of said first male fastener is at said distal end of said first coupler, and said first female fastener is at said proximal end of said first coupler.

7. The EMI transfer fitting of claim 1 wherein said attachment means to said flexible conduit is characterized by a complementary set of exterior and interior threads, one of said threads being attached to said second female fastener and the other of said threads being attached to said second male fastener.

8. The EMI transfer fitting of claim 1, wherein at least one of said couplers is made from a corrosion resistant material.

9. The EMI transfer fitting of claim 8 wherein said corrosion resistant material is made at least in part from electroless nickel plated aluminum.

10. An EMI transfer fitting comprising:
 a first coupler for connection to a first piece of conduit, said first coupler having a distal end engaging with said first piece of conduit and a proximal end opposite said distal end; and,
 a second coupler attached to said proximal end, said second coupler having an attachment means for connecting to a flexible conduit for carrying a sheathed cable therein, said second coupler further having a male fastener, a hollow insert for passing said cable therethrough and passing said sheath thereover, and a female fastener, said male fastener and said female fastener having a cooperating tightening means for urging said male fastener towards said female fastener, such that when said male and female fasteners are tightened said sheath is impinged between an exterior of said insert and an interior of said male fastener.

11. The EMI transfer fitting of claim 10 wherein said first piece of conduit is unthreaded rigid conduit for carrying a cable bundle, said first coupler having a first coupler male fastener, a compression ring and a first coupler female fastener for receiving said conduit therethrough, one of said first coupler male and female fasteners being at said distal end and adjacent to said rigid conduit and the other of said first coupler male and female fasteners being at said proximal end opposite said distal end, said first coupler male fastener and said first coupler female fastener having a first cooperating tightening means for urging said first male coupler fastener towards said first coupler female fastener, such that when said first coupler male and female fasteners are tightened, said compression ring has external pressure applied thereto thereby securely grasping said conduit within said first coupler male fastener.

12. The EMI transfer fitting of claim 10, wherein at least one of said couplers is made from a corrosion resistant material.

13. The EMI transfer fitting of claim 12, wherein said corrosion resistant material is made at least in part from electroless nickel plated aluminum.

* * * * *